United States Patent
Zhang et al.

(10) Patent No.: US 11,520,347 B2
(45) Date of Patent: Dec. 6, 2022

(54) COMPREHENSIVE AND EFFICIENT METHOD TO INCORPORATE MAP FEATURES FOR OBJECT DETECTION WITH LIDAR

(71) Applicant: Baidu USA LLC, Sunnyvale, CA (US)

(72) Inventors: Liangliang Zhang, San Jose, CA (US); Hongyi Sun, Sunnyvale, CA (US); Li Zhuang, Sunnyvale, CA (US); Jiangtao Hu, Sunnyvale, CA (US); Dong Li, Sunnyvale, CA (US); Jiaming Tao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 680 days.

(21) Appl. No.: 16/255,789

(22) Filed: Jan. 23, 2019

(65) Prior Publication Data

US 2020/0233429 A1    Jul. 23, 2020

(51) Int. Cl.
G05D 1/02 (2020.01)
G01S 17/89 (2020.01)
G01C 21/36 (2006.01)
G01S 17/931 (2020.01)

(52) U.S. Cl.
CPC ....... *G05D 1/0231* (2013.01); *G01C 21/3667* (2013.01); *G01S 17/89* (2013.01); *G01S 17/931* (2020.01); *G05D 1/0212* (2013.01); *G05D 2201/0213* (2013.01)

(58) Field of Classification Search
CPC .. G05D 1/0231; G05D 1/0212; G01S 17/931; G01S 17/89; G01C 21/3667

USPC .......................................................... 701/23
See application file for complete search history.

(56) References Cited

U.S. PATENT DOCUMENTS

| | | | |
|---|---|---|---|
| 10,970,518 B1* | 4/2021 | Zhou | G06T 15/08 |
| 2017/0039436 A1* | 2/2017 | Chen | G06K 9/4628 |
| 2017/0270361 A1* | 9/2017 | Puttagunta | B60W 30/00 |
| 2018/0364717 A1* | 12/2018 | Douillard | G06K 9/00791 |
| 2019/0137287 A1* | 5/2019 | Pazhayampallil | G01C 21/32 |
| 2019/0346844 A1* | 11/2019 | Chen | B60W 60/00 |
| 2020/0109959 A1* | 4/2020 | Wu | G01C 21/3484 |
| 2020/0159225 A1* | 5/2020 | Zeng | G05D 1/0088 |

OTHER PUBLICATIONS

Krisada Chaiyasam et al., "Crack Detection in Masonry Structures using Convolutional Neural Networks and Support Vector Machines", 35th International Symposium on Automation and Robotics in Construction (ISARC 2018), Jul. 20-25, 2018, 8 pp. total.

Yin Zhou et al., "VoxelNet: End-to-End Learning for Point Cloud Based 3D Object Detection", 2018 IEEE/CVF Conference on Computer Vision and Pattern Recognition (CVPR), Jun. 2018, 10 pp. total.

* cited by examiner

*Primary Examiner* — Isaac G Smith
(74) *Attorney, Agent, or Firm* — Womble Bond Dickinson (US) LLP (57) ABSTRACT

According to various embodiments, systems and methods described in the disclosure combine mapped features with point cloud features to improve object detection precision of an autonomous driving vehicle (ADV). The map features and the point cloud features can be extracted from a perception area of the ADV within a particular angle view at each driving cycle based on a position of the ADV. The map features and the point cloud features can be concatenated and provided to a neutral network for object detections.

20 Claims, 9 Drawing Sheets

COMPREHENSIVE AND EFFICIENT METHOD TO INCORPORATE MAP FEATURES FOR OBJECT DETECTION WITH LIDAR

TECHNICAL FIELD

Embodiments of the present disclosure relate generally to operating autonomous driving vehicles. More particularly, embodiments of the disclosure relate to object perceptions and detections by an autonomous driving vehicle that combines map features with point cloud features.

BACKGROUND

Autonomous driving vehicles (ADV) can relieve occupants, especially the driver, from some driving-related responsibilities. When operating in an autonomous mode, a vehicle can navigate to various locations using onboard sensors and high definition maps, allowing the vehicle to travel with minimal human interaction or in some cases without any passengers.

Safe and reliable autonomous driving of an ADV requires accurate perception and detection of objects in surrounding environments of the ADV. High definition maps accurately represent surrounding environments of an ADV. Therefore, an ADV that only relies on its sensor systems without using information from a high definition map for object detections may lose overall precision of object detections.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

For each move of an ADV travelling on a road, the ADV may perceive and detect objects in a surrounding environment of the ADV, predict how the object will behave, and plan one or more paths based on the prediction. ADVs typically rely on point cloud features and other sensor data for detecting objects in their surrounding environments.

According to various embodiments, described herein are systems and methods for incorporating features extracted from a high definition map used by an ADV into the object detection process to boost the overall precision of object detection. In one embodiment, map features can be extracted by a convolution neural network, and can be combined (e.g., concatenated) with point cloud features extracted by a feature learning network from a point cloud generated by an ADV. The combined feature list can be provided to one or more neutral networks for object detections by the ADV. An output of a neural network provides an indication indicating a likelihood (e.g., probability) an object has been detected at a particular location at a particular time. The mapped features can supplement point cloud features, and provide additional information from the driving environment surrounding the ADV. Since additional information is used in various embodiments of the disclosure, these embodiments can more precisely perceive and detect objects compared to systems and methods that use only sensor data.

In one embodiment, the map features and the point cloud features can be extracted from a perception area of the ADV within a particular angle view at each driving cycle. The view angle can correspond to a heading of the ADV. Information from a high definition map can be extracted and grouped into multiple layers, with each layer sharing the same gridding dimension but with different features. The layered map features can be extracted based on a position of the ADV at each timestamp corresponding to a driving cycle or another time interval. The layered map features within a fan-shaped area corresponding to a heading of the ADV can be combined or concatenated with features extracted from a point cloud within a fan-shaped space, and can be used as an input to one or more neural networks for object detections. The fan-shaped space may be created by the view angle of the ADV and a vertical scanning angle of one or more LiDAR units in the ADV.

In one embodiment, a method for object detections for use by the ADV can include extracting map features from a map used by the ADV, which is associated with a road in which the ADV is driving; extracting point cloud features from a point cloud in a surrounding environment of the ADV; and combining the extracted map features with the extracted point cloud features to create a combined feature list. The method further includes providing the combined feature list as an input to a number of neural networks to detect one or more objects in the surrounding environment.

In one embodiment, the map can be a high definition map, and the map features extracted from the high definition map can include one or more lanes, one or more lane boundaries, one or more traffic signs, and one or more road curbs. The map features can be extracted by a convolution neural network that performs the following operations: extracting the map layers from the map; converting the map layers into a red, blue and green (RBG) representation; and extracting map features from the RGB representation using the convolution neural network. In one embodiment, the extracted map features can be pre-calculated. After they are extracted, the map features can be cached to speed up online inference of the convolution neural network.

In one embodiment, the point cloud features can be extracted using a fully connected network (FCN). The FCN can partition a space within the perception area of the ADV into multiple equally spaced voxels (i.e., cells), encode each non-empty voxel with point-wise features, and combine the point-wise features with a locally aggregated feature. The point-wise features for each non-empty voxel represent statistical quantities derived from all LiDAR points within that voxel. Examples of the statistical quantities can include a distance from the center of the voxel to an origin of the point cloud, a maximum height of a LiDAR point within the voxel, and a mean height of LiDAR points within the voxel.

In one embodiment, the neural networks that use the concatenated feature list for object detections can include a convolution neutral network and a region proposal network. The convolution neural network can generate a feature map based on the concatenated feature list, and provide the feature map to the region proposal network. The region proposal network can map the feature map to one or more desired learning targets to generate object detections.

Autonomous Driving Vehicle

Figure 1:
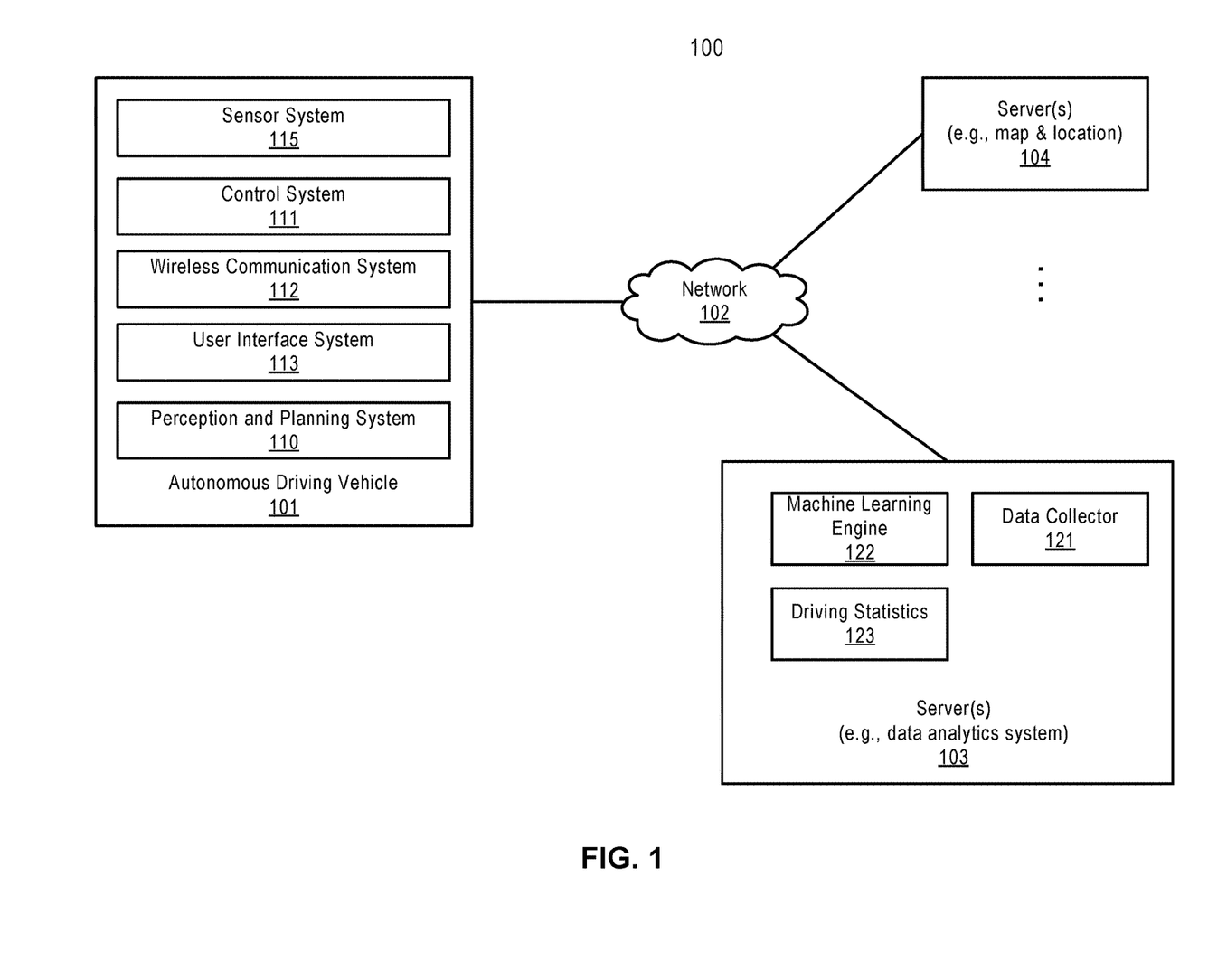
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
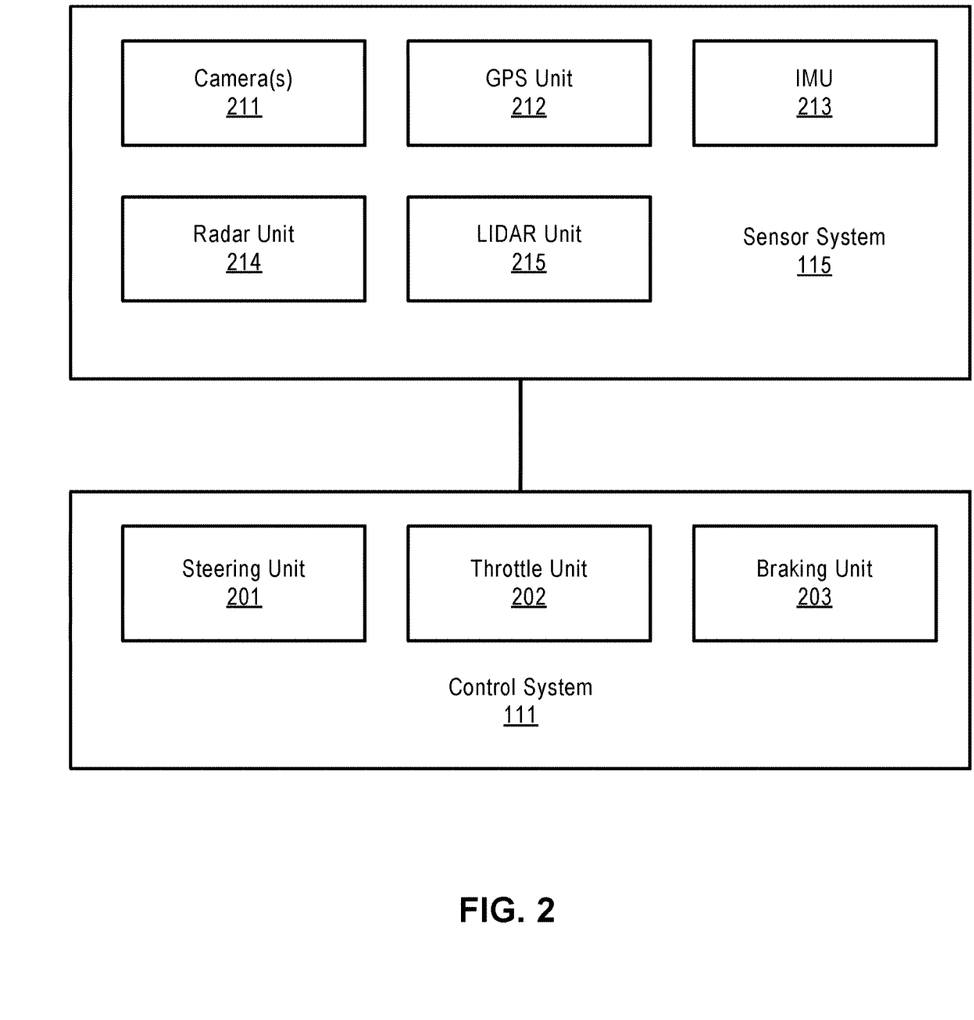
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, a set of one or more machine-learning models such as neural networks can be trained for object detection based on map features and point cloud features. Algorithms/models 124 can then be uploaded on ADVs to be utilized for object detection during autonomous driving in real-time.

Figure 3A:
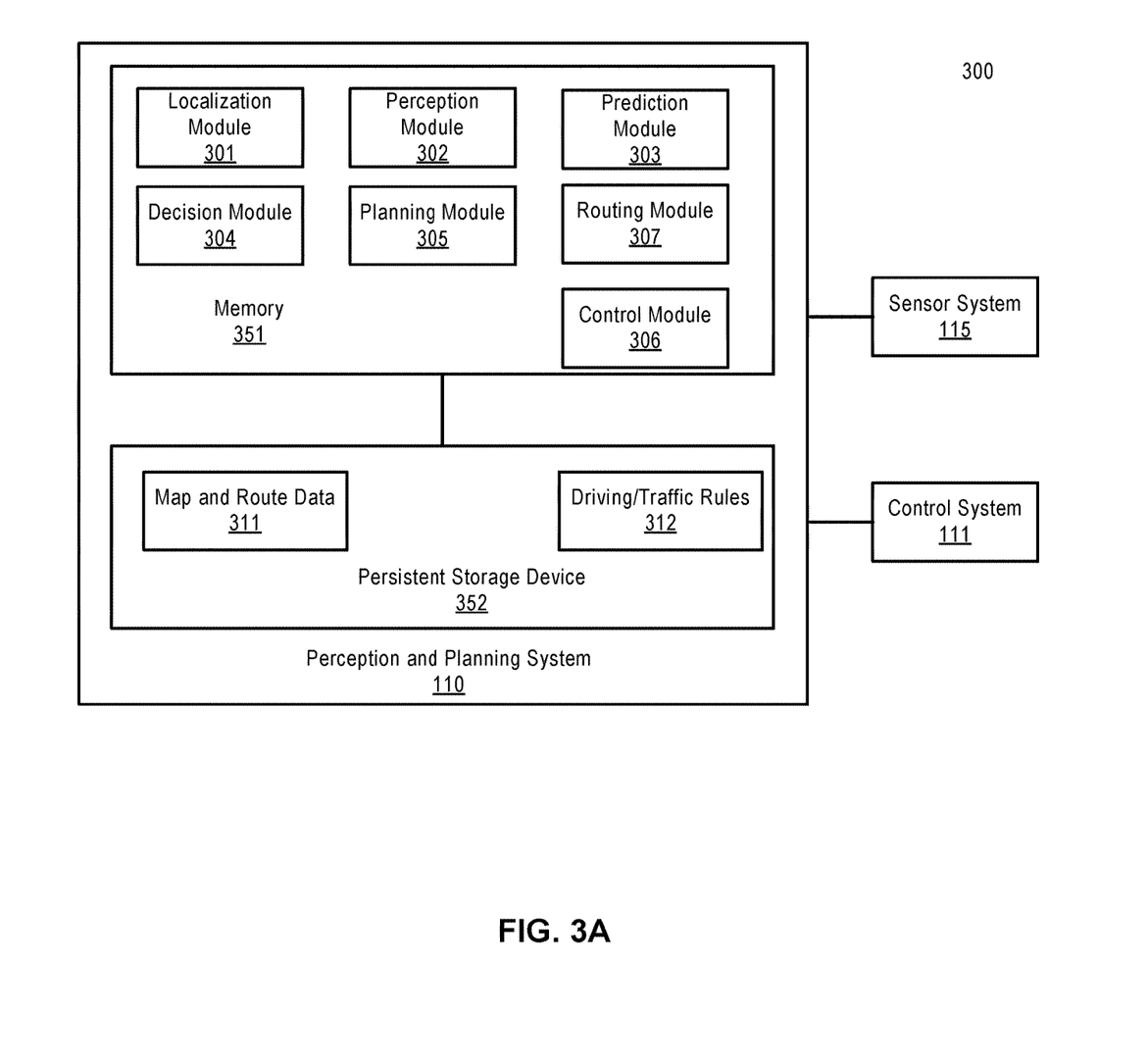
FIGS. 3A-3B are block diagrams illustrating an example of a perception and planning system used with an autonomous vehicle according to one embodiment.
Figure 3B:
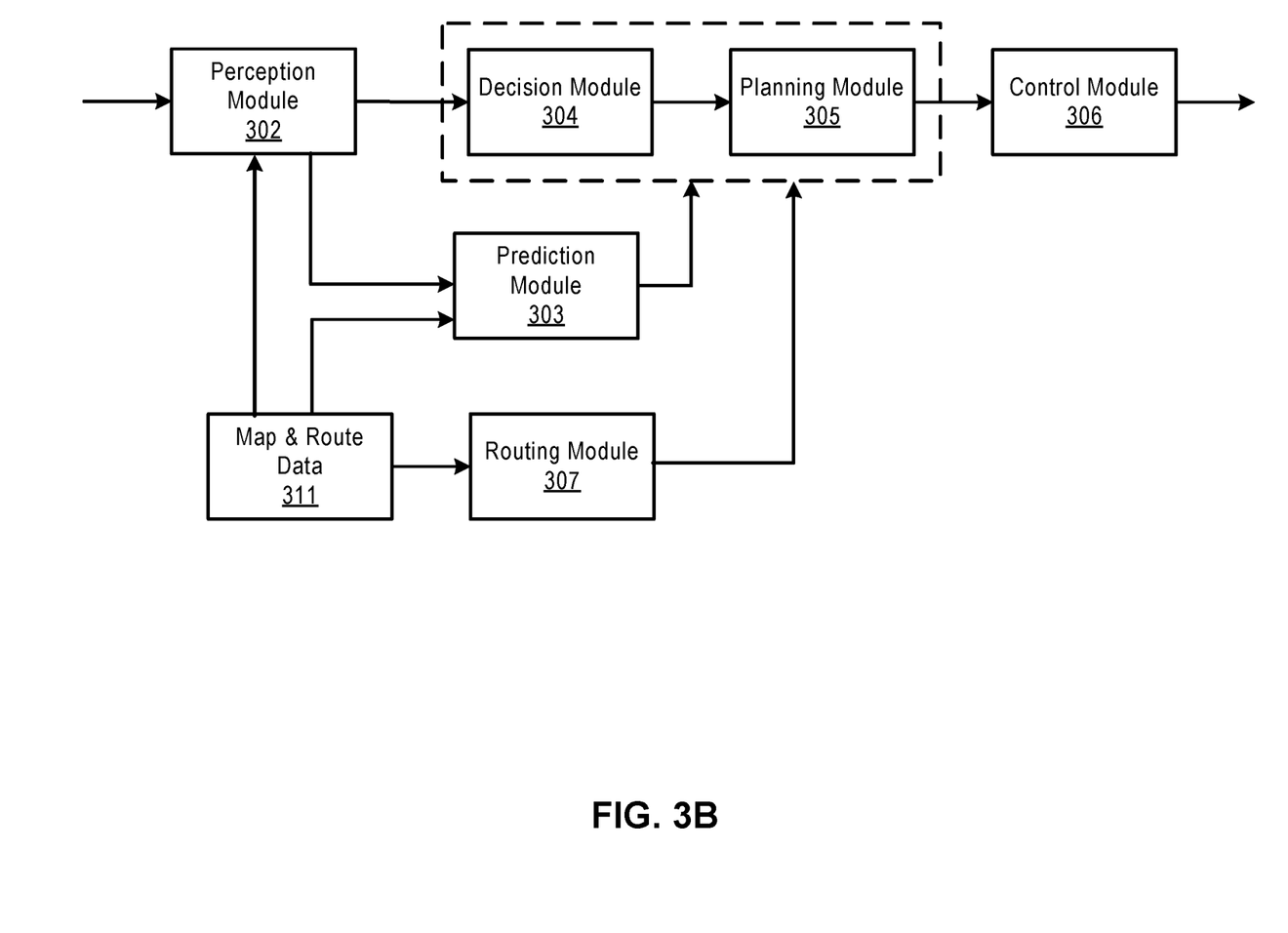

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Map and route data 311 can also be used by the perception module 302 in object detection. For example, features can be extracted from map and route data 311 and can be combined with features extracted from a point cloud to detect objects by the ADV.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Combining Map Features and Point Cloud Features

Figure 4:
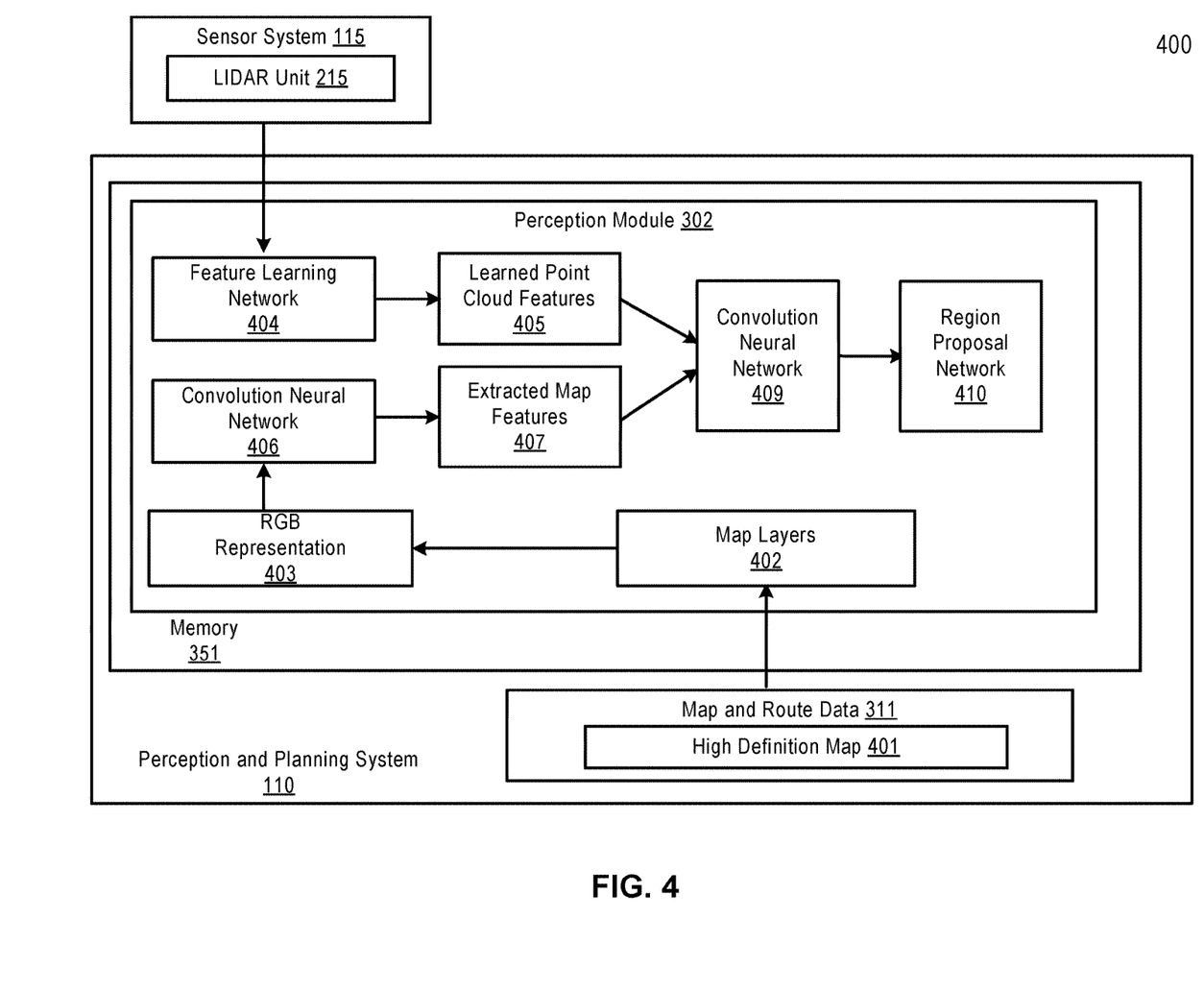
FIG. 4 illustrates a system for object detections for use by an autonomous driving vehicle in accordance with an embodiment.

FIG. 4 illustrates a system for object detections for use by an autonomous driving vehicle in accordance with an embodiment. As shown in FIG. 4, the perception module 302 can use a geographic information system (GIS) tool to extract a number of map layers 402 from a high definition (HD) map 401 stored in the map and route data module 311. A map layer can be a GIS database containing groups of point, lines, or area (polygon) features that represent a particular class or type of real-world entities, such as traffic lanes, traffic signs, static objects, speed limits, and general road information.

In one embodiment, the map layers 402 can be extracted from the HD map 401 within an angle of view of an ADV for each driving cycle. The angle of view is based on an angle corresponding to the heading of the ADV. The depth of the angle of view can be predetermined by the perception module 302. The map layers 402 can be extracted based on the position of the ADV at each timestamp for a driving cycle. Since the heading of the ADV in motion keeps changing, the perception module 302 may extract information from different parts of the HD map 401 to formulate the map layers 402 for different driving cycles of the ADV.

The map layers 402 can be concatenated and converted into a red, green and blue (RGB) representation 403, which can be an m-by-n-by-3 data array that defines red, green, and blue color components for each individual pixel. The RGB representation 403 can be provided as input data to a convolution neural network 406, which can extract a number of map features 407 from the RGB representation 403. Each of the extracted features 407 can be a patch of the RGB representation 403, and can be represented by a binary grid (e.g., a binary grid of 0 s and 1 s). For example, a map feature can be a binary grid or a feature map representing a stop sign, a road curb, or a lane boundary in the HD map 401.

In one embodiment, a feature learning network 404 can be provided in the perception module 302 to extract point cloud features 405 from a point cloud generated by the LiDAR unit 215 in the sensor system 115. Similarly, each of the point cloud features 405 can be represented by a binary grid.

In one embodiment, to extract or learn the point cloud features 405, the feature learning network 404 can partition a space within the angle of view of the ADV into multiple equally spaced voxels (i.e., cells). Each non-empty voxel can include one or more LiDAR points of the data cloud generated by the LiDAR unit 215. Each LiDAR point can have a number of attributes, including coordinates and a received reflectance. The coordinates of each LiDAR point indicates a position of the LiDAR point in the point cloud relative to the origin of the LiDAR unit 215. The received reflectance of each LiDAR point measures a ratio of an amount of radiation sent to a material surface over an amount received by the LiDAR unit 215.

In one embodiment, attributes of each LiDAR point in a voxel (e.g., coordinates of a LiDAR point) can be used to derive a number of statistical quantities. Examples of the statistical quantities can include a distance from the center of the voxel to an origin of the point cloud, a maximum height of a LiDAR point within the voxel, and a mean height of all LiDAR points within the voxel. The statistical quantities can be converted into point-wise features of the voxel by the feature learning network 404.

An element-wise max pooling can be used across all point-wise features in a voxel to get a locally aggregated feature of the voxel. Each point-wise feature can then be augmented with the locally aggregated feature to generate a point-wise concatenated feature. The non-empty voxels within a particular fan-shaped space at a particular timestamp therefore can be encoded to generate a number of point-wise concatenated features, as represented by the learned point cloud features 405. In one embodiment, the fan-shaped space can be created by a view angle and a vertical scanning angle at the particular timestamp corresponding to a driving cycle of the ADV.

The encoding process of extracting point cloud features described above is provided for illustration purposes. Other processes of extracting features from a point cloud within a particular view angle can be similarly used. As an example of the other processes, a local mean as centroid of all the LiDAR points in a voxel can be computed. Each LiDAR point in the voxel can be augmented with the relative offset with respect to the centroid. Attributes of each LiDAR point can be transformed through a fully connected network (FCN) into a feature space. All information in the feature spaces in the voxel can be aggregated to encode a shape of a surface in the voxel. An element-wise max pooling can be used across all point-wise features (e.g., feature spaces, offsets, etc.) in the voxel to get a locally aggregate feature for the voxel. Each point feature can be concatenated with the locally aggregated feature to form a point-wise concatenated feature.

As further shown in FIG. 4, a convolution neutral network 409 in the perception module 402 can aggregate the learned point cloud features 405 and the extracted map features. An output of the convolution neutral network 409 can be provided as an input to a regional proposal network 410 for object detections.

Figure 5:
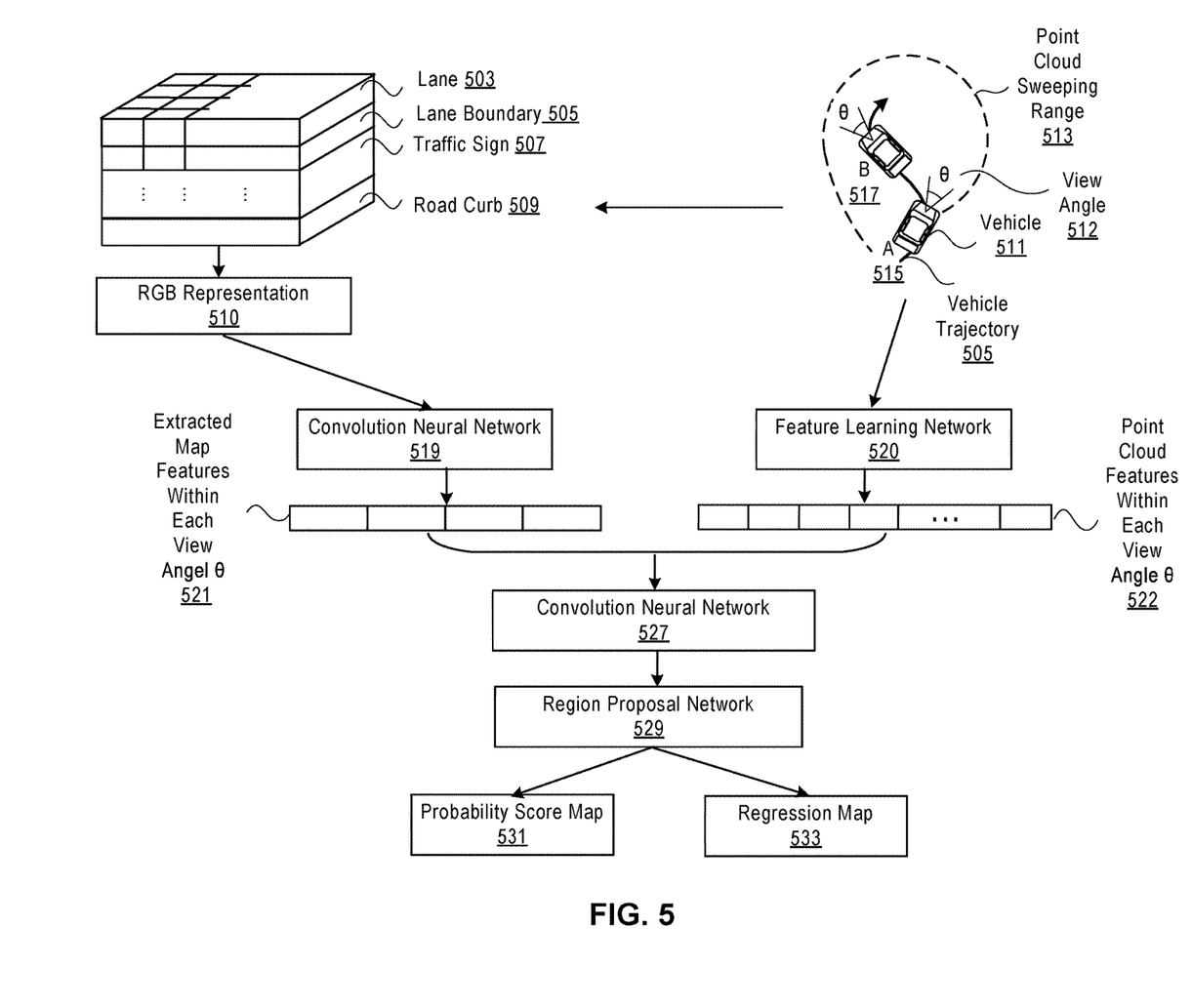
FIG. 5 shows, in graphic format, shows an exemplary process for use by an autonomous driving vehicle in in detecting objects in accordance with an embodiment.

FIG. 5 shows, in graphic format, shows an exemplary process for use by an autonomous driving vehicle in in detecting objects in accordance with an embodiment. Referring to FIG. 5, a vehicle 511 (e.g., an ADV) can have a particular view angle θ 512 as the vehicle is travelling on a planned trajectory 505. Due to the specifications of one or more LiDAR units on the vehicle 511, the vehicle may have a point cloud sweeping range 513. As the vehicle 511 moves from position A 515 to position B 517 along the trajectory, the vehicle 511 may have different surrounding environments, including different point cloud features and different map features within the vehicle's view angle.

In one embodiment, for each pre-determined time interval (e.g., a driving cycle or another planning cycle), the vehicle 511 can extract a number of map features from a high definition map and a number of point cloud features from a point cloud with the view angle for that pre-determined time interval.

As shown in FIG. 5, the high definition (HD) map used by the vehicle can include a number of layers implemented using a tensor. For example, the map layers can include a lane feature layer 503, a lane boundary layer 505, a traffic sign layer 507, and a road curb layer 509. Other map layers (e.g., a static object layer and a general road information layer) can also be extracted from the HD map depending configurations of the vehicle. The map layers can be converted into an image-like RGB representation 510, which can be a 3-dimensional array. A trained convolution neutral network model 519 can be provided in the perception module 302 to extracting features from the RGB representation 510. Each of the extracted map features 521 can represent a patch of the RGB representation 510.

The map features extraction process described above can be repeated for each predetermined time interval (e.g., each driving cycle of the vehicle). As the vehicle starts to extract the map features at a timestamp for each predetermined time interval, the vehicle also extracts point cloud features 522 from the view angle at the same timestamp using a feature learning network 520.

In one embodiment, the map 521 features extracted and the point cloud features 522 can be concatenated and provided to a convolution neural network 527 for feature aggregation. The aggregated features between the map features 521 and the point cloud features 522 can be provided as an input to a region proposal network 529 for object detections.

The region proposal network 529 is a trained neutral network model that proposes multiple identifiable objects within a particular image. The region proposal network 529 can generate the multiple proposals from a region where an object lies by sliding over a feature map previously generated by the convolution neural network 527 from the combined features of the map features 521 and the point cloud feature 522. The region proposal network 529 can have a classifier and a regressor, which can generate a probability score map 531 and a regression map 533 respectively. The probability score map 531 can show the probability of a proposal having the target object, while the regression map 533 can regress the coordinates of the proposals. The probability score map 531 and the regression map 533 can be used in conjunction to detect and perceive an object in surrounding environments of the vehicle 511 within each view angle.

Figure 6:
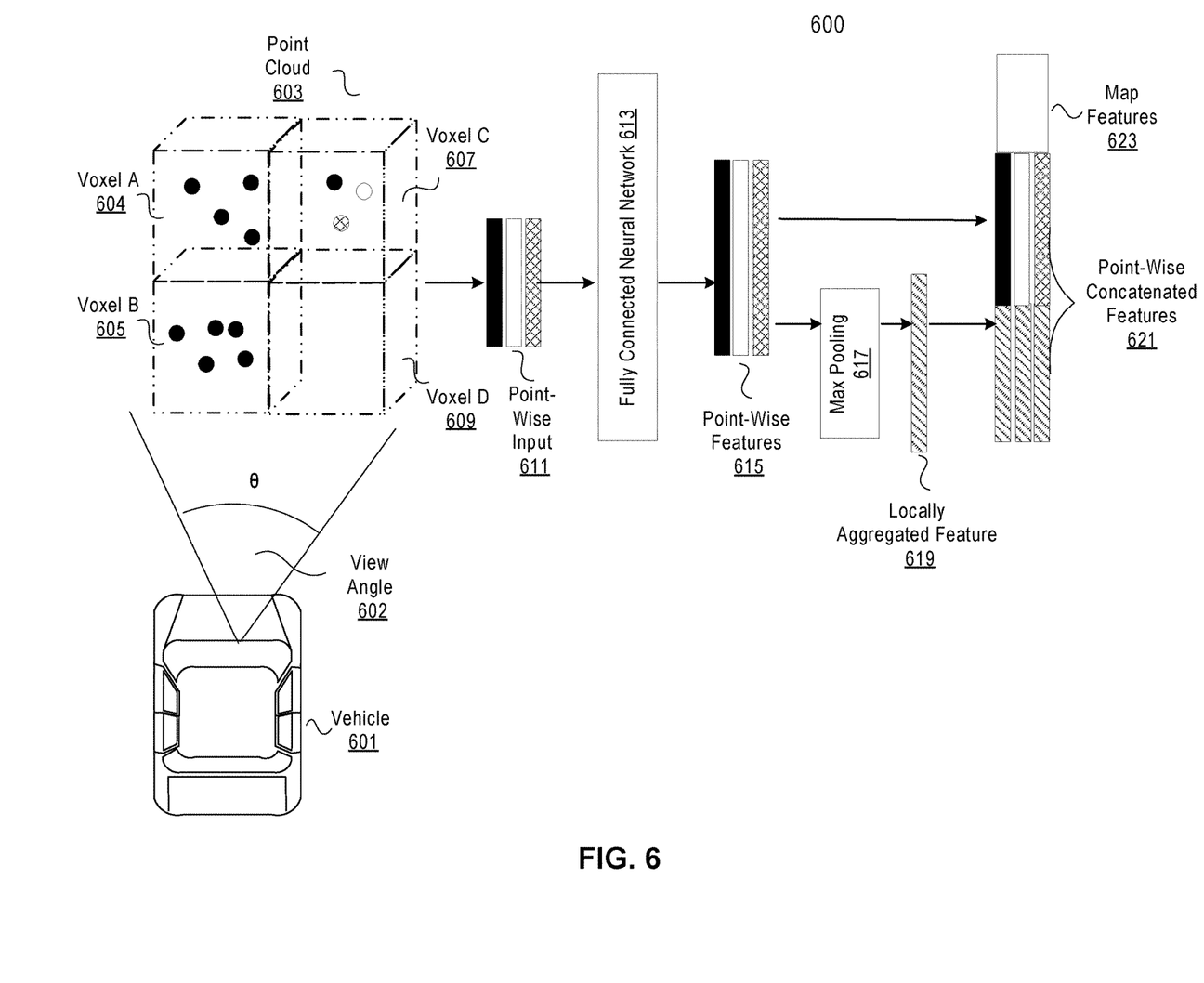
FIG. 6 shows, in graphical format, an exemplary feature learning network in accordance with an embodiment.

FIG. 6 shows, in graphical format, an exemplary feature learning network in accordance with an embodiment. As shown in FIG. 6, a vehicle 601 (e.g., an ADV) may have a view angle θ 612. At any particular time while the vehicle 601 is travelling along a trajectory, the vehicle 601 may have a perception area within the view angle 612. A space within the perception area can contain a portion of a point cloud 603 generated by one or more LiDAR units of the vehicle 611. The feature learning network 600 can encode the portion of the point cloud 603 as a descriptive volumetric representation.

In one embodiment, to encode the portion of the point cloud 604, the feature learning network 600 can first partition the space into equally spaced voxels, for example, voxel A 604, voxel B 605, voxel C 607, and voxel D 609.

In one embodiment, not all voxels contain LiDAR points. For example, voxel D 609 does not contain any LiDAR point, whereas voxel A 604 contains 4 LiDAR points, voxel B 605 contains 5 LiDAR points, and voxel C 608 contains 3 LiDAR points.

The feature learning network 600 can extract one or more point-wise concatenated features from each non-empty voxel. FIG. 6 use voxel C 607 as an example to illustrate the feature extraction process.

In one embodiment, the feature learning network 600 can derive statistical quantities of all LiDAR points in voxel C, and provide the statistical quantities as a point-wise input 611 to a fully connected network 613, which can transform the statistical quantities to point-wise features 615. An element-wise max pooling 617 can be used across the point-wise features 615 in voxel C 607 to generate a locally aggregated feature of the voxel 619. Each of point-wise features 615 can then be augmented with the locally aggregated feature 619 to generate a point-wise concatenated feature.

Other non-empty voxels (e.g., voxel A 604 and voxel B 605) within the view angle 602 can be similarly encoded to generate their own point-wise concatenated features 621. Point-wise concatenated features from all non-empty voxels within the view angle at the particular timestamp are point cloud features. The point cloud features can be further concatenated with map features 623 extracted from a high definition map within the view angle at the particular timestamp.

Figure 7:
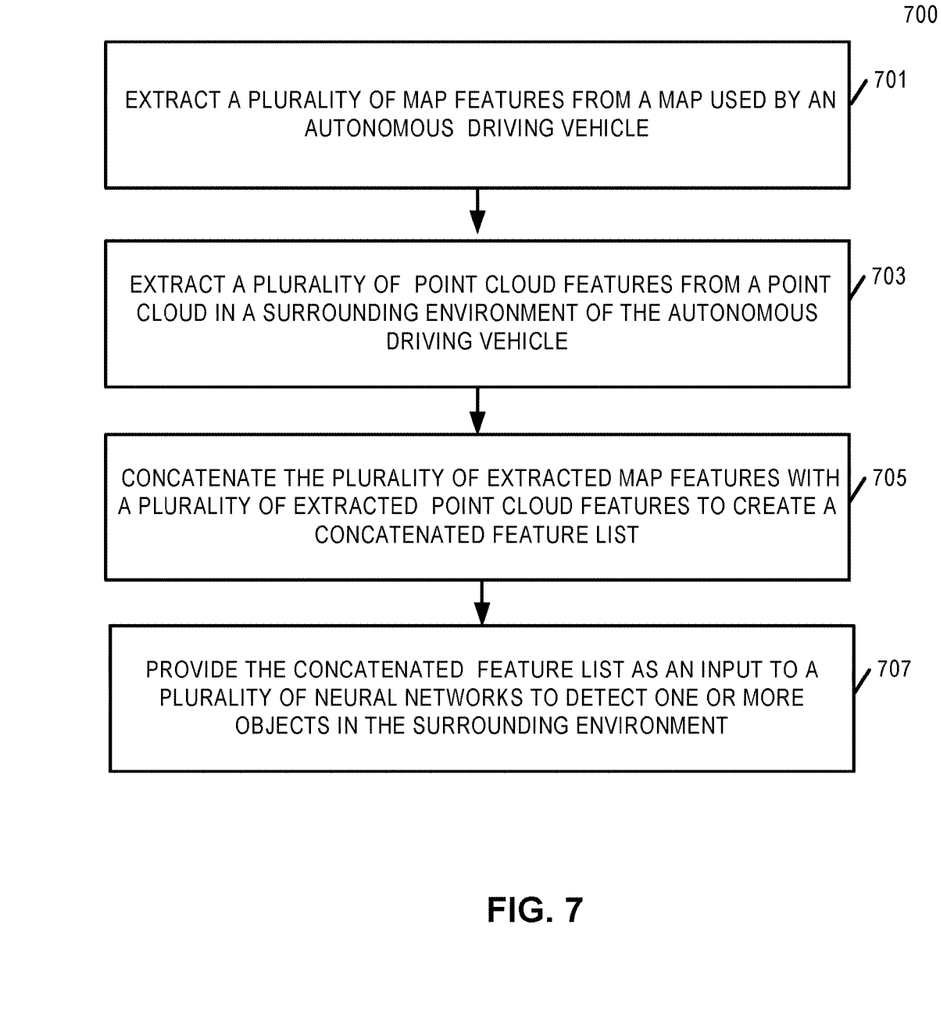
FIG. 7 is a flow diagram illustrating an example process for use by an autonomous driving vehicle in detecting objects in accordance with an embodiment.

FIG. 7 is a flow diagram illustrating an example process for use by an autonomous driving vehicle in detecting objects in accordance with an embodiment. Process 700 may be performed by processing logic which may include software, hardware, or a combination thereof. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 700 may be performed by one or more of modules as illustrated in FIG. 3A, FIG. 3B, and FIG. 4

Referring to FIG. 7, in operation 701, a number of features are extracted from a map by an ADV using a convolution neural network. The map can be a high definition map used by the ADV. The map features are extracted from the high definition map within a view angle of the ADV. Extracting the features from the high definition map include extracting a number of layers from the high definition map; and converting the plurality of layers into a red, blue and green (RBG) representation; and extracting the plurality of features from the RGB representation using one or more convolution layers of the convolution network. The map layers can include a lane feature layer, a traffic sign layer, a static object layer and a general map information layer. All layers share the same grid dimensions, and each layer is extracted from different information on the high definition map.

In operation 703, a number of point cloud features are extracted from a point cloud in the surrounding environment of the ADV. The point cloud features are extracted from a view angle or a fan-shaped space at a particular timestamp by a FCN. The FCN can partition a space within the view angle into multiple equally spaced voxels, encode each non-empty voxel with point-wise features, and combine the point-wise features with a locally aggregated feature. The FCN can combine the point-wise features for each non-empty voxel with a locally aggregated feature to generate point-wise concatenated features from the view angle at the particular timestamp.

In operation 705, the point-wise concatenated features from all the non-empty voxel in the view angle at a particular timestamp are further concatenated with the map features extracted from a high definition map to create a concatenated feature list. Each feature can be presented by a binary grid.

In operation 707, the concatenated feature list is provided as an input to a number of neural networks to detect one or more objects in the surrounding environment. The neural networks that use the concatenated feature list for object detections can include a convolution neutral network and a region proposal network. The convolution neural network can generate a feature map based on the concatenated feature list, and provide the feature map to the region proposal network. The region proposal network can map the feature map to one or more desired learning targets to generate detections of objects.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
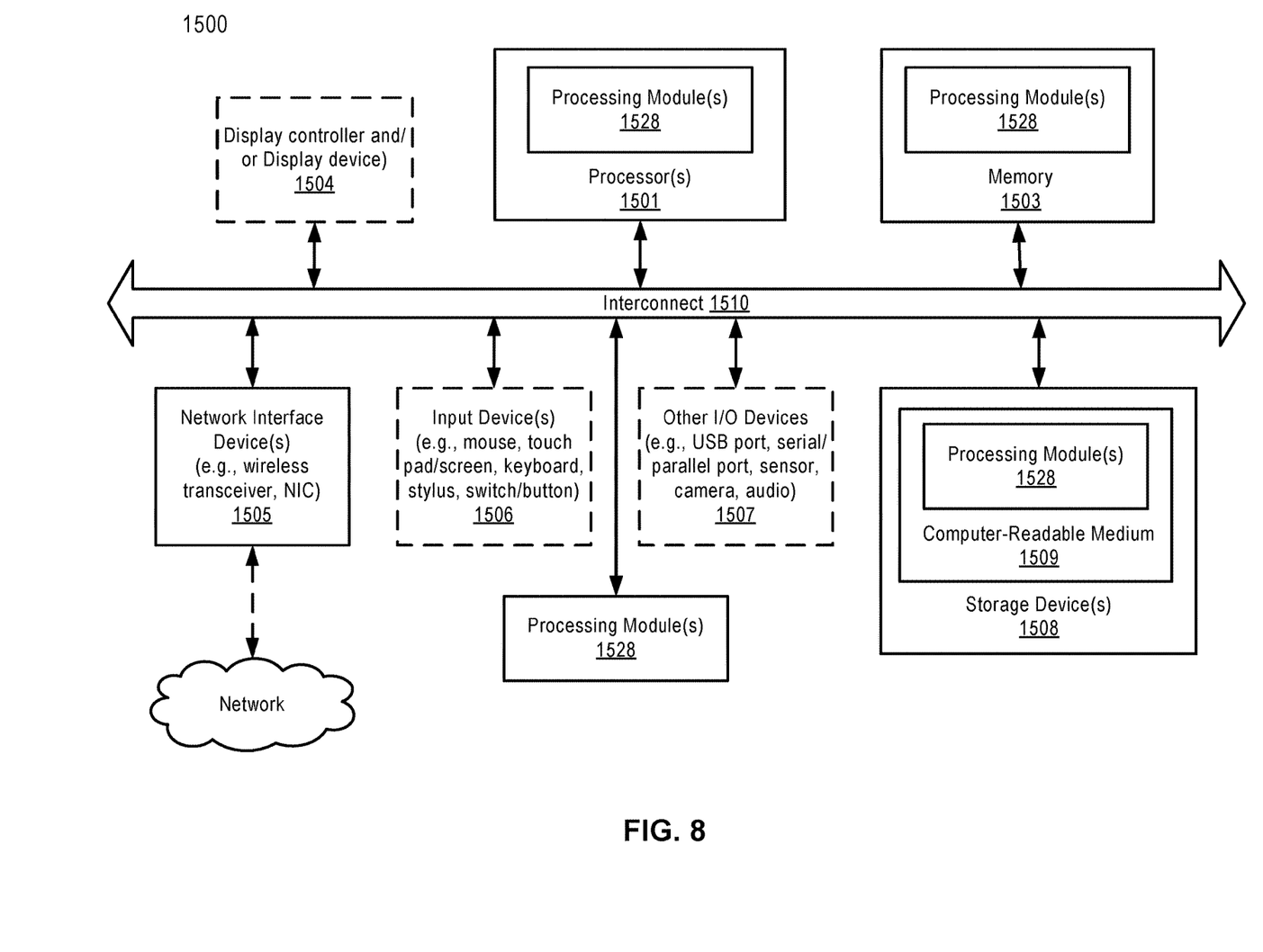
FIG. 8 a block diagram illustrating an example of a data processing system which may be used with one embodiment of the disclosure.

FIG. 8 a block diagram illustrating an example of a data processing system which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, and control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the method comprising:
    extracting a plurality of map features from a map associated with a road in which the ADV is driving, wherein the plurality of map features are extracted from a portion of the map, the portion of the map corresponding to a perception area of the ADV within a particular angle of view at each driving cycle, wherein the particular angle of view corresponds to a heading of the ADV;
    extracting a plurality of point cloud features from a portion of a point cloud of LIDAR data, the portion of the point cloud corresponding to the perception area of the ADV within the particular angle of view;
    concatenating the plurality of point cloud features and the plurality of map features into a feature list;
    providing the feature list as input to one or more neural networks, which detect one or more objects in a driving environment based on the input; and
    generating a trajectory during each driving cycle of the ADV in view of the detected objects to drive the ADV through the detected objects.

2. The method of claim 1, wherein the plurality of map features are extracted using a convolution neural network, and include one or more lanes, one or more lane boundaries, one or more traffic signs, and one or more road curbs.

3. The method of claim 1, wherein the extracting the plurality of map features from the map includes:
    forming a plurality of layers, each layer corresponding to one of the plurality of map features extracted from the map;
    converting the plurality of layers into a red, green, and blue (RGB) representation; and
    extracting the plurality of map features from the RGB representation.

4. The method of claim 1, wherein the extracted map features are pre-calculated and cached to speed up inference of the one or more neural networks.

5. The method of claim 1, wherein the plurality of point cloud features are extracted using a fully connected network, which is to partition a space within the perception area into a plurality of equally spaced voxels, to encode each non-empty voxel with a plurality of point-wise features, and to combine the point-wise features with a locally aggregated feature.

6. The method of claim 5, wherein the plurality of point-wise features for each non-empty voxel represent statistical quantities derived from all LiDAR points within that voxel, and include a distance from the center of the voxel to an origin of the point cloud, a maximum height of LiDAR points within the voxel, and a mean height of LiDAR points within the voxel.

7. The method of claim 1, wherein the one or more neural networks include a convolution neural network and a region proposal network, wherein the convolution neural network generates a feature map based on the plurality of map features and the plurality of point cloud features, and wherein the region proposal network maps the feature map to one or more desired learning targets to generate object detections.

8. A non-transitory machine-readable medium having instructions stored therein, which when executed by a processor, causing the processor to perform operations of operating an autonomous driving vehicle (ADV), the operations comprising:
    extracting a plurality of map features from a map associated with a road in which the ADV is driving, wherein the plurality of map features are extracted from a portion of the map, the portion of the map corresponding to a perception area of the ADV within a particular angle of view at each driving cycle, wherein the particular angle of view corresponds to a heading of the ADV;
    extracting a plurality of point cloud features from a portion of a point cloud of LIDAR data, the portion of the point cloud corresponding to the perception area of the ADV within the particular angle of view;
    concatenating the plurality of point cloud features and the plurality of map features into a feature list;
    providing the feature list as input to one or more neural networks, which detect one or more objects in a driving environment based on the input; and
    generating a trajectory during each driving cycle of the ADV in view of the detected objects to drive the ADV through the detected objects.

9. The machine-readable medium of claim 8, wherein the plurality of map features are extracted using a convolution neural network, and include one or more lanes, one or more lane boundaries, one or more traffic signs, and one or more road curbs.

10. The machine-readable medium of claim 8, wherein the extracting the plurality of map features from the map comprises:
    forming a plurality of layers, each layer corresponding to one of the plurality of map features extracted from the map;
    converting the plurality of layers into a red, green, and blue (RGB) representation; and
    extracting the plurality of map features from the RGB representation using one or more convolution layers of a convolution neural network.

11. The machine-readable medium of claim 8, wherein the extracted map features are pre-calculated and cached to speed up inference of the one or more neural networks.

12. The machine-readable medium of claim 8, wherein the plurality of point cloud features are extracted using a fully connected network, which is to partition a space within the perception area into a plurality of equally spaced voxels, to encode each non-empty voxel with a plurality of point-wise features, and to combine the point-wise features with a locally aggregated feature.

13. The machine-readable medium of claim 12, wherein the plurality of point-wise features for each non-empty voxel represent statistical quantities derived from all LiDAR points within that voxel, and include a distance from the center of the voxel to an origin of the point cloud, a maximum height of LiDAR points within the voxel, and a mean height of LiDAR points within the voxel.

14. The machine-readable medium of claim 8, wherein the one or more neural networks include a convolution neural network and a region proposal network, wherein the convolution neural network generates a feature map based on the plurality of map features and the plurality of point cloud features, and wherein the region proposal network maps the feature map to one or more desired learning targets to generate object detections.

15. A data processing system, comprising:
a processor; and
a memory coupled to the processor to store instructions, which when executed by a processor, causing the processor to perform operations of operating an autonomous driving vehicle (ADV), the operations comprising:
  extracting a plurality of map features from a map associated with a road in which the ADV is driving, wherein the plurality of map features are extracted from a portion of the map, the portion of the map corresponding to a perception area of the ADV within a particular angle of view at each driving cycle, wherein the particular angle of view corresponds to a heading of the ADV,
  extracting a plurality of point cloud features from a portion of a point cloud of LIDAR data, the portion of the point cloud corresponding to the perception area of the ADV within the particular angle of view,
  concatenating the plurality of point cloud features and the plurality of map features into a feature list,
  providing the feature list as input to one or more neural networks, which detect one or more objects in a driving environment based on the input, and
  generating a trajectory during each driving cycle of the ADV in view of the detected objects to drive the ADV through the detected objects.

16. The system of claim 15, wherein the plurality of map features are extracted using a convolution neural network, and include one or more lanes, one or more lane boundaries, one or more traffic signs, and one or more road curbs.

17. The system of claim 15, wherein the extracting the plurality of map features from the map comprises:
  forming a plurality of layers, each layer corresponding to one of the plurality of map features extracted from the map;
  converting the plurality of layers into a red, green, and blue (RGB) representation; and
  extracting the plurality of map features from the RGB representation using one or more convolution layers of a convolution neural network.

18. The system of claim 15, wherein the extracted map features are pre-calculated and cached to speed up inference of the one or more neural networks.

19. The system of claim 18, wherein the plurality of point cloud features are extracted using a fully connected network, which is to partition a space within the perception area into a plurality of equally spaced voxels, to encode each non-empty voxel with a plurality of point-wise features, and to combine the point-wise features with a locally aggregated feature.

20. The system of claim 19, wherein the plurality of point-wise features for each non-empty voxel represent statistical quantities derived from all LiDAR points within that voxel, and include a distance from the center of the voxel to an origin of the point cloud, a maximum height of LiDAR points within the voxel, and a mean height of LiDAR points within the voxel.

* * * * *